United States Patent [19]
Hashemi

[11] Patent Number: 5,405,718
[45] Date of Patent: Apr. 11, 1995

[54] ELECTRODES AND BATTERY CELLS

[75] Inventor: Tooraj Hashemi, Belmont, Great Britain

[73] Assignee: Elmwood Sensors Limited, Tyne & Wear, Great Britain

[21] Appl. No.: 952,743

[22] PCT Filed: May 31, 1991

[86] PCT No.: PCT/GB91/00876
§ 371 Date: Nov. 30, 1992
§ 102(e) Date: Nov. 30, 1992

[87] PCT Pub. No.: WO91/19327
PCT Pub. Date: Dec. 12, 1991

[30] Foreign Application Priority Data
May 31, 1990 [GB] United Kingdom ............. 9012084

[51] Int. Cl.$^6$ .......................... H01M 4/02
[52] U.S. Cl. .................. 429/218; 429/224; 429/225; 429/229
[58] Field of Search ............. 429/224, 218, 225, 229

[56] References Cited

U.S. PATENT DOCUMENTS
4,307,164 12/1981 Church et al. ............. 429/229 X
4,372,823 2/1983 Church et al. ............. 429/231 X

OTHER PUBLICATIONS
CA 97 (20):166136b, JP Chem. abstract, Jun. 15, 1982—JP 80-172937 801208.
CA 92 (10):86783s, chem. abstract Eup., 1979—Nguyen, Mater. Res. Bull., 14(12) Eng. 1979 (no month).
T. Hashemi et al, "Diacadmium Stannate as a Novel Electrode Material for Battery Applications," Journal of the Electrochemical Society, vol. 134, No. 7, Jul. 1987.

*Primary Examiner*—Prince Willis, Jr.
*Assistant Examiner*—M. Nuzzolillo
*Attorney, Agent, or Firm*—Wolf, Greenfield & Sacks

[57] ABSTRACT

Ceramic electrodes of cadmium germanate and other ternary oxide materials, provide electrodes for secondary battery cells. Open circuit voltages of 1.5 volts are attainable. The absence of crystallographic phase changes on charge/discharge is noted and renders possible the use of solid electrolytes, possibly in a unitary ceramic structure.

23 Claims, 1 Drawing Sheet

ELECTRODES AND BATTERY CELLS

BACKGROUND OF THE INVENTION

This invention relates to electrodes for use in batteries, and in related applications. The invention also relates to battery cells.

The commonly employed Ni/Cd secondary battery cell has a number of important disadvantages. The open cell voltage (typically around 1.15 volts) is too low for the battery to be conveniently interchangeable with primary batteries having an open cell voltage of around 1.5 volts. Both forms of cadmium appearing in the battery—metallic cadmium and cadmium oxide—are known to be toxic and the standard electrolyte of concentrated potassium hydroxide is extremely corrosive. For these reasons, guaranteed containment of the cell contents is essential and the production costs of the cell housing are relatively high.

The number of charge/discharge cycles that can reliably be undergone by a Ni/Cd battery may be enough for some domestic purposes but is not sufficient for many specialised applications where a battery is required to undergo reliably 1,000; 5,000 or even more charge/discharge cycles. An important factor in limiting the charge/discharge life of a Ni/Cd battery is the internal stress created upon the change of phase from metallic cadmium to cadmium oxide. Each charge/discharge cycle involves a structural change within the cadmium electrode resulting, over a few hundred cycles, in mechanical deterioration. The same factor will apply to a number of other known battery electrodes such as $MnO_2$, which involve a change of phase.

In cases where there is a limited supply of charging energy, it is necessary to take into account the energy associated with the phase change. When used, for example, as a storage battery in combination with solar cells, the Ni/Cd battery is able to make less use of the solar charging energy than would be the case if no phase change were involved.

It should further be noted that cadmium oxide, in common with a number of other known electrode materials, is insufficiently electrically conductive to be used directly as an electrode and requires to be mixed with graphite in production of a battery cell. This may involve manufacturing difficulties. The need to incorporate the material within an electrode which is not inherently electroactive is more generally regarded as an important drawback.

Reference is directed to *Journal of the Electrochemical Society* July 1987, pages 1591-1594 Hashemi et al *"Dicadmium Stannate as a Novel Electrode Material for Battery Applications"*. This proposes an electrode for secondary battery cells which offers some advantages over the conventional electrodes.

It is one object of the present invention to provide a further improved electrode which can be used in a secondary battery cell substantially to overcome some or all of the described disadvantages of known secondary battery cells.

SUMMARY OF THE INVENTION

Accordingly, the present invention consists in one aspect in an electrode for use in battery cells or the like, comprising cadmium germanate as the electrode material.

Preferably, the electrode comprises a sintered body of cadmium germanate.

In another form, the present invention consists in a rechargeable battery having a negative electrode comprising cadmium germanate as the electroactive material.

Advantageously, the negative electrode comprises a porous ceramic body of cadmium germanate.

A rechargeable battery cell using cadmium germanate as the electroactive material for the negative electrode offers a number of advantages over commercially available batteries.

There is no substantial structural difference between the oxidised and reduced states of the $Cd_2GeO_4$ electrode and hence the charge/discharge cycle is not associated with any phase change. This is in contrast with known electrodes such as CdO and $MnO_2$. As has been mentioned above, the lack of a phase change is important for two reasons. First, the energy normally associated with this phase change (in—for example—Ni/Cd batteries) no longer needs to be considered within the charge/discharge cycle. The energy balance within the cycle becomes increasingly important when the battery is used in applications where there is a limited supply of energy, such as in the storage of solar energy in conjunction with solar cells. A battery constructed using a $Cd_2GeO_4$ electrode is clearly able to store much more of the energy than a conventional rechargeable battery. Secondly, the phase transformation taking place in other electrode systems during the charge/discharge cycle can lead to the build up of internal stresses, limiting the number of cycles available in conventional rechargeable batteries. Since no phase change takes place with the $Cd_2GeO_4$ electrode, the number of charge/discharge cycles is greatly increased.

In a further aspect, the present invention consists in a rechargeable battery comprising a positive electrode, an electrolyte and a negative electrode comprising a ceramic electrode body comprising a ternary oxide material of formula $A_xBO_y$, where A and B are ions of different metals; $x=1$ or 2 and $y=2$, 3 or 4, the negative electrode undergoing on charging and discharging off the battery cell an electrochemical reaction involving no change of phase in A or B and the battery cell providing an open cell voltage of at least 1.5 volts.

Preferably, the ternary oxide material is selected From the group consisting of zinc stannate, lead stannate, barium stannate, magnesium stannate, barium germanate and lead germanate.

It is found, when used for example with the same positive electrode as a conventional Ni/Cd battery, at room temperature, the electrodes according to this preferred form of the invention are capable of providing an open circuit voltage of at least 1.5 volts. This means that batteries utilising these electrodes can be used as one-for-one replacements for conventional primary battery cells.

Cadmium germanate and the other ternary oxide materials that have been specifically mentioned can be processed using conventional ceramic powder techniques enabling complex shapes to be produced without costly machining operations. In addition, the surface area of the electrode can be controlled by means of a choice of porosity, enabling the formation of large surface areas within a small volume, if required. This means that miniature batteries having a high open circuit voltage or batteries manufactured with electrodes of highly specialised shape, may be possible. Since the materials can also be evaporated, it should be possible to use thick film techniques in the production of electrodes.

The electrical conductivity of cadmium germanate and zinc stannate is sufficiently high to enable the formation of an electrode without graphite or other conductive filler material. This may enable manufacture to be simplified and electrodes to be reduced in volume.

The choice of electrolyte is of course an important aspect of battery design. Commonly, liquid electrolytes are employed, but for low power applications requiring long shelf and service life, solid-electrolyte battery cells have been developed. Solid-state lithium battery cells are commercially available and used for applications such as heart pacemakers and within computers to preserve volatile memory. Lithium battery cells are, however, limited to low power applications (typically microwatts). This is because of the high impedance of most solid state electrolytes at normal ambient temperatures, high contact resistance between electrodes and electrolyte and the possibility of mechanical stress through volume changes associated with temperature or with electrode discharge reactions.

A known, improved solid-state battery cell uses a solid electrolyte of rubidium silver iodide which exhibits an unusually high ionic conductivity of 0.26 $(ohm.cm)^{-1}$ at room temperature. A silver anode is employed with the cathode formed as a mixture of carbon and tetramethylammonium pentaiodide ($Me_4NI_5$). It emerges, however, that high electrolyte conductivity does not itself overcome all the problems associated with solid-state battery cells. Electrode/electrolyte interfacial resistance must also be taken into account in this respect and, in contrast to the more familiar situation with conventional aqueous systems, where the solid electrodes are uniformally wetted by the liquid electrolyte, the solid state configuration of the cell may create non-uniform contact at the interface. Differential expansion and contraction of electrodes and electrolyte may lead to poor contact and consequential high internal resistance. This situation is undesirable in primary battery cells but becomes an extremely serious problem with secondary cells. Here, the creation of localised areas of contact between electrode and electrolyte promotes, on charging and discharging, localised deposition of metal in dendritic Form. The problem is thus aggravated and large metallic depositions can indeed lead to fracture.

Interfacial polarization phenomena are presently among the most severe problems in the development of practical secondary cells. Some work has recently been done to reduce this problem by mixing the electrode material with the electrolyte, for example as compressed powders, to form an electrodic mass with an enlarged interfacial area. In this way, the current density at the electrode/electrolyte interface is reduced and the problems of polarization are, it is hoped, alleviated. There are, however, serious problems in the development of such cells with the result that practical solid-state cells capable of operating at ambient temperatures remain of the primary type.

It is an object of a still further Form of the present invention to provide an improved rechargeable battery cell with a solid electrolyte.

Accordingly, in yet a further aspect, the present invention consists in a rechargeable battery comprising a positive electrode, a solid electrolyte and a negative electrode comprising a ceramic electrode body comprising a ternary oxide material of formula $A_xBO_y$ where A and B are ions of different metals, $x=1$ or 2 and $y=2,3$ or 4, the negative electrode undergoing on charging and discharging of the battery and electrode chemical reaction involving no change of phase in A or B.

Preferably the ternary oxide material is selected from the group consisting of cadmium germanate, cadmium stannate, zinc stannate, barium stannate, magnesium stannate, barium germanate, magnesium germanate and lead germanate.

It will be understood that because the reduction of the ternary oxide material in the charge cycle results in the formation of lower valency states of oxides but not the metallic phase, the problem of localised metallic deposition at the electrode/electrolyte interface is removed. Since, as explained above, there is no significant crystallographic phase change associated with charge and discharge, the interfacial stresses are very much reduced leading to a considerable improvement in the number of charge/discharge cycles that can be expected. The use of a ceramic electrode body with a solid electrolyte will be expected also to reduce problems of differential thermal expansion.

A wide variety of solid electrolyte materials can be employed in the present invention, including rubidium silver iodide as mentioned above, or $\beta$ aluminas of the general formula $AM_{11}O_{17}$ where A is Na, K, Rb, Ag, Te, or Li and M is Al, Fe or Ga.

BRIEF DESCRIPTION OF THE DRAWINGS

The present invention will now be described by way of example with reference to the accompanying drawings, in which.

DESCRIPTION OF THE PREFERRED EMBODIMENTS

Figure 1:
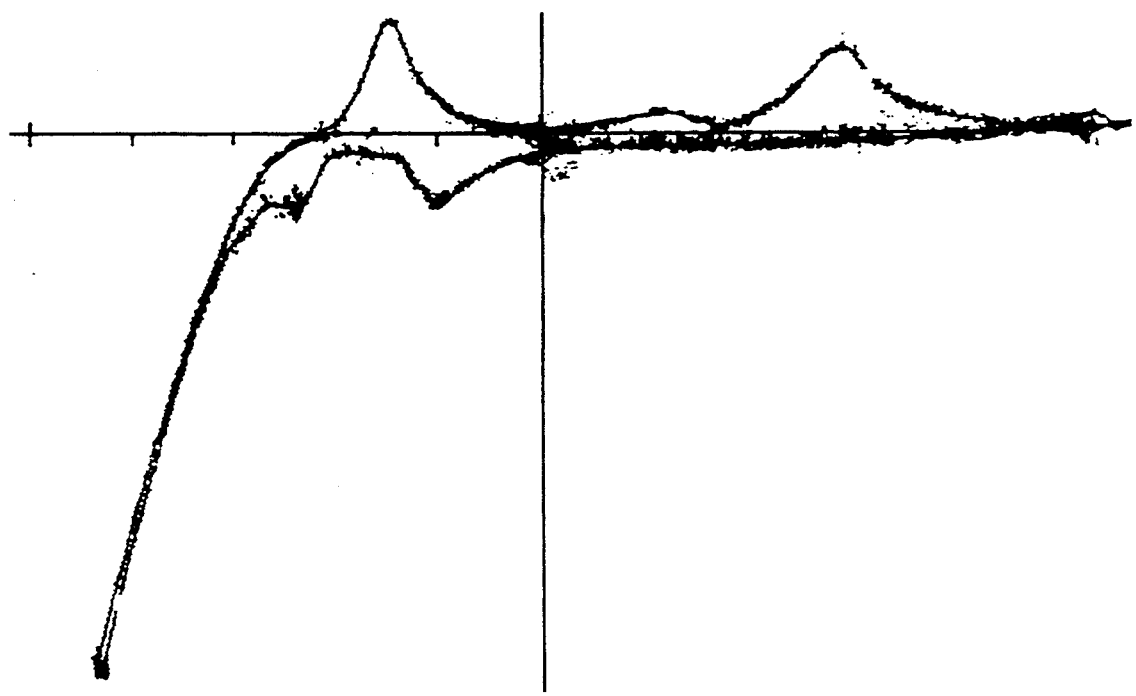
FIG. 1 is a cyclic voltammogram of an electrode according to the present invention.

In the production of a cadmium germanate electrode according to this invention, pellets of $2CdO:1GeO_2$ were presintered at 850° C. for 12 hours, after which they were crushed and ground. Pellets were then repressed and sintered at 1080° C. for a further 12 hours. The sintering process yielded a body with approximately 40% porosity which is favourable for electrochemical applications since the surface area is extremely high. An ohmic contact was applied to one side of the pellet which was then covered with epoxy resin so as to expose one face only to the electrolyte.

A simple rechargeable cell was constructed using the above described cadmium germanate electrode, without further treatment, as the negative electrode. The positive electrode was prepared From a commercial Ni/Cd cell having a theoretical maximum energy density of 320 mAh/g. The electrolyte was a dilute solution of NaOH and the electrodes were mounted in a simple beaker-type glass cell with no separator. Charging was conducted galvanostatically and discharging was carried out under a constant load condition. In order to investigate the charge to discharge characteristics of the batteries forced polarization was performed with an external current off 10 mA. After each cycle, the coulombic efficiency was determined and compared with data from previous cycles. No significant changes of efficiency were observed after several thousand charge/discharge cycles. It will be recognized that repeated, forced polarization is a particularly harsh test of an electrode and even longer lives would be expected under "normal" charge/discharge conditions.

Self discharge and stability of the constructed cells were investigated by charging a cell and monitoring its open circuit voltage over a period of time. After an initial, small voltage drop which was anticipated from the behavior of known cells, the cell according to this invention exhibited an open circuit voltage of 1.45 volts for a period of time in excess of four months.

To investigate the electrochemical reactions, a cyclic voltammogram of the cadmium germanate electrode was produced using an auxiliary electrode of platinum and a saturated calomel reference electrode. The sweeping rate was 250 mV/min and the cells operated at 25° C. From the accompanying figure, it can be seen that there are two major waves in each branch of cathodic and anodic voltammograms. These waves were absent in voltammograms of Pt/Pt in identical conditions. It can be concluded that the waves on the catbodie branch are due to the reduction of two species in the working electrode, Ge and Cd. Conversely, the two reduction waves are replaced in the anodic branch by oxidation waves, implying that both Ge and Cd return to their original (as sintered) valency states.

X-ray diffraction patterns of both reduced and oxidised samples were identical, suggesting that no substantial structural changes take place with either the cathodic or anodic polarisation. Moreover, no sign of metal formation was observed during the reduction cycle, even when the applied cathodic overpotentials were increased far beyond those of hydrogen evolution. This is an important feature, indicating no need for a control system for the applied potentials, providing that they are greater than the reduction potentials of Cd and Ge, in this case about −800 mV versus a saturated calomel electrode. This is in contrast with other techniques, for instance annealing the material in a reducing atmosphere where a complete reduction to tile metallic state is readily attainable.

It is anticipated that the oxidation/reduction of cadmium germanate will involve minor changes in unit cell dimensions but these will be associated with stresses and energy levels significantly below those encountered in a phase change.

The nominal capacity of the cadmium germanate electrode was experimentally determined using the chronoamperometry technique to be of the order of 210 mAh/g. This suggests that the Ge(IV)-Ge(II) transition is not the only electrochemical reaction taking place during the charge-discharge cycle, since $GeO_2$ comprises approximately 29 molar % of the electrode. Were this to be the only transition involved, the corresponding theoretical capacity would be approximately 148 mAh/g. The high value of measured capacity implies that during the charge cycle (reduction of the working electrode), some reduction of Cd(II) to Cd(I) takes place in addition to the Ge(IV)-Ge(II) reaction. The existence of two waves in each branch of the cyclic voltammogram discussed earlier, also supports this conclusion.

Turning to alternative ternary oxide materials, the open circuit voltages in battery cells at room temperature are as follows:

| | | |
|---|---|---|
| Zinc Stannate | $Zn_2SnO_4$ | 1.75 V |
| Barium Stannate | $BaSnO_3$ | 1.60 V |
| Magnesium Stannate | $MgSnO_3$ | 1.55 V |
| Barium Germanate | $BaGeO_3$ | 1.65 V |
| Magnesium Germanate | $MgGeO_3$ | 1.60 V |
| Lead Germanate | $PbGeO_3$ | 1.50 V |

These alternatives materials share with cadmium germanate the characteristics that no phase change takes place during the charge/discharge cycle (there being indentical X-ray diffractograms in both oxidised and reduced forms) and that no further reduction to—for example—the metallic state takes place on application of increased cathodic current.

In a working battery cell according to this invention, it will be possible to achieve an open circuit voltage of 1.5 volts together with a sufficiently low internal resistance to enable one-for-one replacement of commercially available primary cells. The choice of electrolyte is largely unrestricted and a wide variety of dilute alkyline solutions can be employed. The containment difficulties associated with corrosive electrolytes are thus avoided. The electrolyte can be chosen to suit the manufacturing technique employed and can be gelled so as to be held within the porous electrode without Further containment. The electrode acccording to this invention can be used with a variety of positive electrodes, the positive electrode of the conventional Ni/Cd battery being a convenient example.

Figure 2:
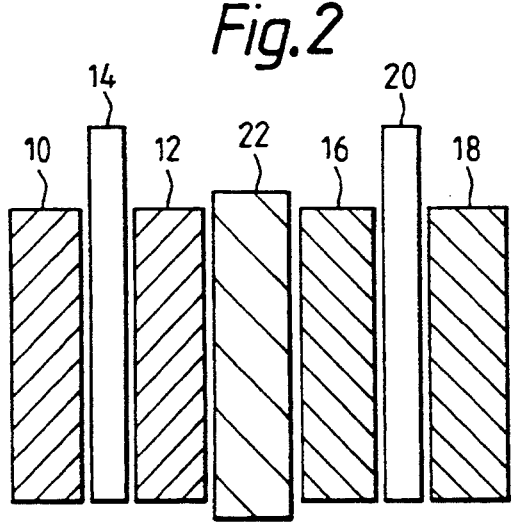
FIG. 2 is a diagrammatic representation of a battery cell according to the present invention.

The alternate has been mentioned above, of solid state electrolytes and a battery cell construction having a solid electrolyte will now be described with reference to FIG. 2.

Using cadmium germanate or zinc stannate, negative electrode leaves 10 and 12 are produced in "green" form, that is to say with the final sintering step omitted. A current collector 14, taking the form, as an example, of a tantalum grid, is sandwiched between the leaves 10 and 12. In similar fashion, positive electrode leaves 16, 18 are produced of nickel oxide in "green" form, sandwiching a current collector 20.

An electrolyte block 22 is Formed of "green" rubidium silver iodide and positioned between the two electrodes. Pressure is then applied in the longitudinal direction of the stack, and a final sintering process undergone at around 1,000° C.

The effect of sintering the pressurised stack is to produce intimate bonding between each electrode and the electrolyte, with the current collectors becoming embedded within the respective electrodes. Because of the feature in electrodes according to this aspect of the invention, that there is no significant crystallographic phase change associated with charge and discharge, interfacial stresses in the solid states battery are very much reduced. The problem of localised metallic deposition at the interfaces is removed, and a large number of charge/discharge cycles can be undergone without mechanical or electrical deterioration. The unitary ceramic construction is robust and problems of differential thermal expansion are unlikely to be serious.

It should be noted that whilst the planar stack geometry has the merit of simplicity of construction it is not the only alternative.

In addition to the inorganic solid electrolytes that have been discussed, there are a wide range of conductive polymers that can be employed. Similarly, other positive electrode structures can be used. The manner of construction will then be selected to suit the particular choice of electrolyte and positive electrode.

It should be understood that this invention has been described by way of example only, and a variety of further modifications are possible without departing from the scope of the invention.

It is claimed:

1. A rechargeable battery comprising a positive electrode, a solid electrolyte and a negative electrode comprising a ceramic electrode body comprising a ternary oxide material, the negative electrode undergoing on charging and discharging of the battery an electrode chemical reaction involving no change of phase, wherein the ternary oxide material is selected from the group consisting of cadmium germanate, zinc stannate, barium stannate, magnesium stannate, barium germanate, magnesium germanate and lead germanate.

2. A battery according to claim 1 wherein the solid electrolyte is selected from the group consisting of silver rubidium iodide and $\beta$ alumina.

3. A battery according to claim 1, wherein the ternary oxide material is cadmium stannate.

4. A battery according to claim 1, wherein the ternary oxide material comprises zinc stannate.

5. A rechargeable battery comprising a positive electrode, an electrolyte and a negative electrode comprising a ceramic electrode body comprising a ternary oxide material, the negative electrode undergoing on charging and discharging of the battery an electrode chemical reaction involving no change in crystallographic structure phase and the battery providing an open cell voltage of at least 1.50 volts, wherein the ternary oxide material is selected from the group consisting of zinc stannate, lead stannate, barium stannate, magnesium stannate, barium germanate, and lead germanate.

6. A battery according to claim 5, wherein the ternary oxide material comprises zinc stannate.

7. A rechargeable battery comprising a positive electrode, an electrolyte and a negative electrode, the negative electrode having as electroactive material a ternary oxide selecting from the group consisting of cadmium germanate, zinc stannate, lead stannate, barium stannate, magnesium stannate, magnesium germanate, barium germanate and lead germanate.

8. A battery according to claim 7, wherein the ternary oxide material comprises zinc stannate.

9. A rechargeable battery comprising a positive electrode, an electrolyte and a negative electrode comprising a ceramic electrode body comprising a ternary oxide material, wherein the ternary oxide material is selected from the group consisting of cadmium germanate, zinc stannate, barium stannate, magnesium stannate, barium germanate, magnesium germanate and lead germanate.

10. A rechargeable battery according to claim 9 wherein the negative electrode undergoes an electrochemical reaction with no change of phase in ionic components of the ternary oxides.

11. A rechargeable battery according to claim 9 comprising a positive electrode, a solid electrolyte and a negative electrode comprising a ternary oxide material, wherein the solid electrolyte is a solid selected from the group consisting of silver rubidium iodide and $\beta$-alumina.

12. A battery according to claim 11, wherein the ternary oxide material is selected from the group consisting of zinc stannate, lead stannate, barium stannate, magnesium stannate, barium germanate and lead germanate.

13. A battery according to claim 12 wherein the electrolyte is a solid.

14. A battery according to claim 11, wherein the ternary oxide material is provided in a porous ceramic body.

15. A battery according to claim 14 wherein the pores of said ceramic body contain electrolyte.

16. A battery according to claim 11, wherein the ternary oxide material is cadmium stannate.

17. A battery according to claim 11, wherein the ternary oxide material comprises zinc stannate.

18. A battery according to claim 5 or claim 7, wherein the ternary oxide material is provided in the form of a porous ceramic body.

19. A battery according to claim 18 wherein the pores of said ceramic body contain said electrolyte.

20. A battery according to claim 1 or claim 2 wherein the negative electrode and solid electrolyte are sintered to form a unitary body.

21. A battery according to claim 20, wherein the negative electrode, the positive electrode and the solid electrolyte are sintered to form a unitary ceramic body.

22. A battery according to any one of claims 9 and 11, wherein the negative electrode and solid electrolyte form a unitary ceramic body.

23. A battery according to claim 22, wherein the negative electrode, the positive electrode and the solid electrolyte are sintered form a unitary ceramic body.

* * * * *